United States Patent
Takahashi et al.

(10) Patent No.: US 9,856,810 B2
(45) Date of Patent: Jan. 2, 2018

(54) DEVICE AND METHOD FOR CONTROLLING VARIABLE COMPRESSION RATIO INTERNAL COMBUSTION ENGINE

(71) Applicant: NISSAN MOTOR CO., LTD., Yokohama-shi, Kanagawa (JP)

(72) Inventors: Eiji Takahashi, Isehara (JP); Shinobu Kamada, Kawasaki (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/654,005

(22) PCT Filed: Dec. 16, 2013

(86) PCT No.: PCT/JP2013/083618
§ 371 (c)(1),
(2) Date: Jun. 19, 2015

(87) PCT Pub. No.: WO2014/119151
PCT Pub. Date: Aug. 7, 2014

(65) Prior Publication Data
US 2015/0330315 A1 Nov. 19, 2015

(30) Foreign Application Priority Data

Jan. 29, 2013 (JP) ................ 2013-013844

(51) Int. Cl.
*F02B 75/04* (2006.01)
*F02D 41/12* (2006.01)
(Continued)

(52) U.S. Cl.
CPC ........... *F02D 41/123* (2013.01); *F02B 75/04* (2013.01); *F02D 15/02* (2013.01); *F02D 41/024* (2013.01);
(Continued)

(58) Field of Classification Search
CPC ....... F02D 15/02; F02D 15/04; F02D 41/0295; F02D 2200/0814; F02B 75/04–75/048
(Continued)

(56) References Cited

U.S. PATENT DOCUMENTS

| 2003/0061860 A1* | 4/2003 | Hu ..................... B01D 53/9454 |
| | | 73/23.31 |
| 2005/0056240 A1* | 3/2005 | Sugiyama ............. F02B 75/045 |
| | | 123/78 E |

(Continued)

FOREIGN PATENT DOCUMENTS

| JP | 2004-278415 A | 10/2004 |
| JP | 2008088988 A * | 4/2008 |

(Continued)

*Primary Examiner* — Mahmoud Gimie
*Assistant Examiner* — Josh Campbell
(74) *Attorney, Agent, or Firm* — Drinker Biddle & Reath LLP

(57) ABSTRACT

A fuel cut during deceleration is executed at time point t1. An oxygen storage amount (rOS) which increases with this fuel cut is estimated based on an exhaust air-fuel ratio and an intake air quantity. When the oxygen storage amount (rOS) reaches a threshold value (at time point t2), a target compression ratio (tCR) is corrected to become lower than a basic target compression ratio (tCR). Although a fuel recovery is executed at time point t4, a combustion temperature is lowered because of the lowering of the mechanical compression ratio, so that a production of NOx in a combustion chamber is suppressed. Therefore, worsening of NOx is suppressed even if the oxygen storage amount (rOS) of exhaust-emission purification catalyst (4) is excessive.

3 Claims, 6 Drawing Sheets

(51) Int. Cl.
*F02D 15/02* (2006.01)
*F02D 41/02* (2006.01)

(52) U.S. Cl.
CPC ....... *F02D 41/0295* (2013.01); *F02D 41/126* (2013.01); *F02B 75/048* (2013.01); *F02D 2200/0814* (2013.01); *F02D 2250/36* (2013.01); *Y02T 10/26* (2013.01)

(58) Field of Classification Search
USPC ..................................................... 123/48 A
See application file for complete search history.

(56) References Cited

U.S. PATENT DOCUMENTS

| | | | | |
|---|---|---|---|---|
| 2006/0180118 | A1* | 8/2006 | Takemura | ............ F02B 75/048 |
| | | | | 123/197.4 |
| 2010/0294245 | A1 | 11/2010 | Yoshioka et al. | |
| 2010/0312459 | A1* | 12/2010 | Utsumi | .................. F02D 15/02 |
| | | | | 701/106 |
| 2012/0145128 | A1* | 6/2012 | Tateno | ................. F02B 75/041 |
| | | | | 123/48 B |
| 2014/0238345 | A1* | 8/2014 | Kamada | ............... F02D 31/002 |
| | | | | 123/344 |

FOREIGN PATENT DOCUMENTS

| | | | | |
|---|---|---|---|---|
| JP | 2008-223672 A | | 9/2008 | |
| JP | 2008223672 A | * | 9/2008 | ......... F02D 41/0025 |
| JP | 2009-250163 A | | 10/2009 | |
| JP | 2009250163 A | * | 10/2009 | ........... F02D 41/126 |
| JP | 2009-264150 A | | 11/2009 | |

\* cited by examiner

DEVICE AND METHOD FOR CONTROLLING VARIABLE COMPRESSION RATIO INTERNAL COMBUSTION ENGINE

TECHNICAL FIELD

The present invention relates to a variable compression-ratio internal combustion engine capable of changing a mechanical compression ratio, and more particularly to control device and method that control a variable compression-ratio means in order to reduce an emission amount of NOx.

BACKGROUND ART

In the field of internal combustion engine, various types of variable compression-ratio mechanisms are previously known. For example, a variable compression-ratio mechanism capable of varying the mechanical compression ratio by varying a relative positional relation between a piston and a cylinder, and a variable compression-ratio mechanism configured to vary a volume of combustion chamber by an auxiliary piston/cylinder are widely known.

On the other hand, Patent Literature 1 discloses that the mechanical compression ratio is reduced by use of such a variable compression-ratio mechanism for a predetermined period from a fuel recovery, in the case that a temperature of exhaust-emission purification catalyst has decreased below a threshold value during a fuel cut. That is, an oxygen storage amount in the catalyst increases during the fuel cut. If the temperature of the exhaust-emission purification catalyst is excessively lowered by this fuel cut, the stored oxygen is not efficiently reduced after the fuel recovery so that a reduction action of NOx is weakened during that interval. In the technique of Patent Literature 1, when the temperature of the exhaust-emission purification catalyst is lowered below the threshold value, the mechanical compression ratio is lowered to promptly increase the temperature of the exhaust-emission purification catalyst. Then, oxygen stored in the catalyst is rapidly consumed to suppress the increase of NOx after the fuel recovery.

In Patent Literature 1, the mechanical compression ratio is reduced to increase the catalyst temperature when the temperature of the exhaust-emission purification catalyst becomes lower than or equal to the threshold value. However, a case that the oxygen storage amount in the exhaust-emission purification catalyst becomes sufficiently large although the temperature decrease of the catalyst is small, such as a case that a duration of the fuel cut is short and a case that a duration of idle stop is short is conceivable. In such a case, the technique of Patent Literature 1 is not effective. Hence, there has been room for improvement regarding the decrease of NOx which is emitted from the internal combustion engine.

CITATION LIST

Patent Literature

Patent Literature 1: Japanese Patent Application Publication No. 2009-250163

SUMMARY OF THE INVENTION

A control device for a variable compression-ratio internal combustion engine according to the present invention comprises a variable compression-ratio means capable of varying a mechanical compression ratio of the internal combustion engine; and an oxygen storage-amount obtaining means configured to calculate an oxygen storage amount of an exhaust-emission purification catalyst provided in an exhaust system of the internal combustion engine, wherein the mechanical compression ratio is varied according to the oxygen storage amount.

For example, by lowering the mechanical compression ratio and thereby lowering a combustion temperature, a production of NOx associated with the combustion is decreased so that an amount of NOx which flows from the combustion chamber into the exhaust-emission purification catalyst becomes small. Accordingly, the mechanical compression ratio is varied to respond to (meet) an actual NOx purification ability of the exhaust-emission purification catalyst which is influenced by the oxygen storage amount. Hence, the emission amount of NOx which is emitted to an outside can be decreased.

According to this invention, NOx which is produced in the combustion chamber is suppressed by varying the mechanical compression ratio when the oxygen storage amount in the exhaust-emission purification catalyst is large and the NOx purification ability thereof is low. Therefore, the emission amount of NOx which is emitted to the outside is decreased.

DETAILED DESCRIPTION OF INVENTION

Figure 1:
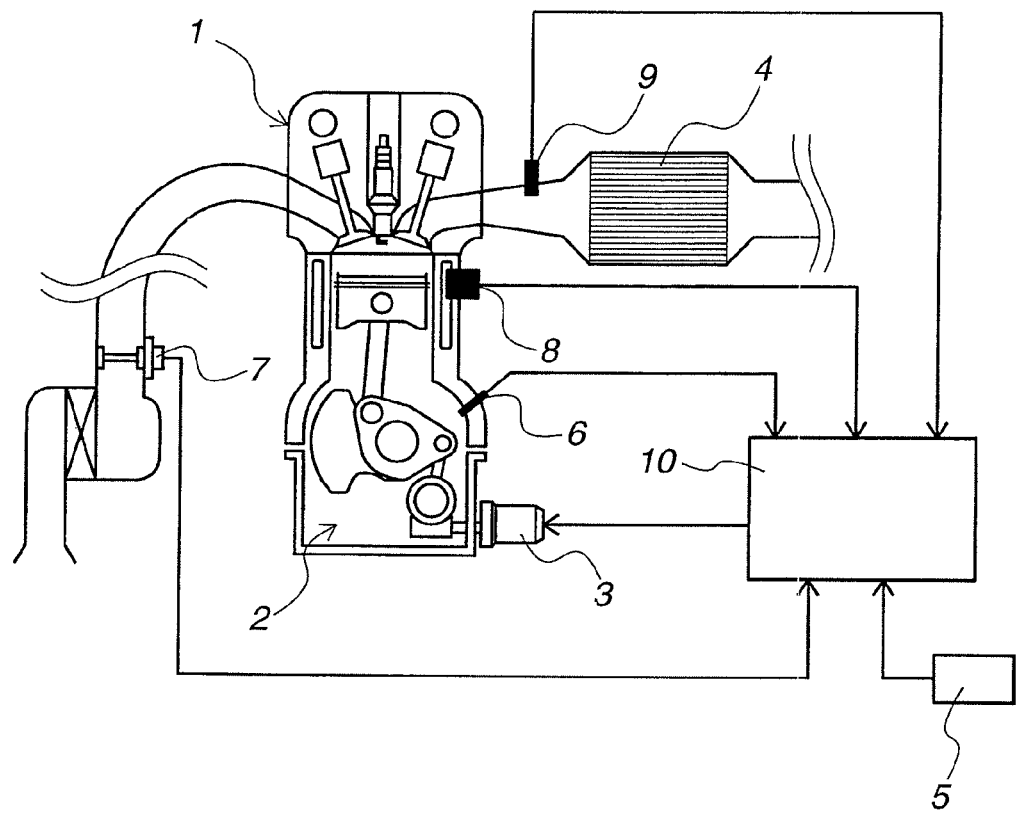
FIG. 1 A configuration explanatory view illustrating an embodiment according to the present invention.

FIG. 1 is a configuration explanatory diagram showing a system configuration of a variable compression-ratio internal combustion engine 1 equipped with a control device according to the present invention.

The internal combustion engine 1 includes a publicly-known variable compression-ratio mechanism 2, and a compression-ratio control actuator 3. The variable compression-ratio mechanism 2 varies a top-dead-center position of a piston in upper and lower directions when a link geometry of a multilink-type piston-crank mechanism is varied. For example, the compression-ratio control actuator 3 is constituted by an electric motor or the like in order to vary the link geometry, i.e. vary a mechanical compression ratio.

In an exhaust system of the internal combustion engine 1, an exhaust-emission purification catalyst 4 is interposed. The exhaust-emission purification catalyst 4 is, for example, constituted by a three-way catalyst. Moreover, there are provided various kinds of sensors such as an accelerator pedal sensor 5, a rotational speed sensor 6, an air flow meter 7, a water temperature sensor 8 and an air-fuel ratio sensor 9. As an operating condition of the internal combustion engine 1, the accelerator pedal sensor 5 senses an opening degree (required load tT) of an accelerator pedal manipulated by a driver, and the rotational speed sensor 6 senses a rotational speed Ne of the internal combustion engine 1. The air flow meter 7 measures an intake air quantity Qa in an intake passage. The water temperature sensor 8 senses a temperature of cooling water of the internal combustion engine 1. The air-fuel ratio sensor 9 measures an exhaust air-fuel ratio at a location upstream of the exhaust-emission purification catalyst 4 in an exhaust passage. Detection signals sensed by these sensors and the like are inputted to an engine control unit 10. The compression-ratio control actuator 3 provided for controlling the mechanical compression ratio is driven such that a target compression ratio based on these detection signals is realized.

Figure 2:
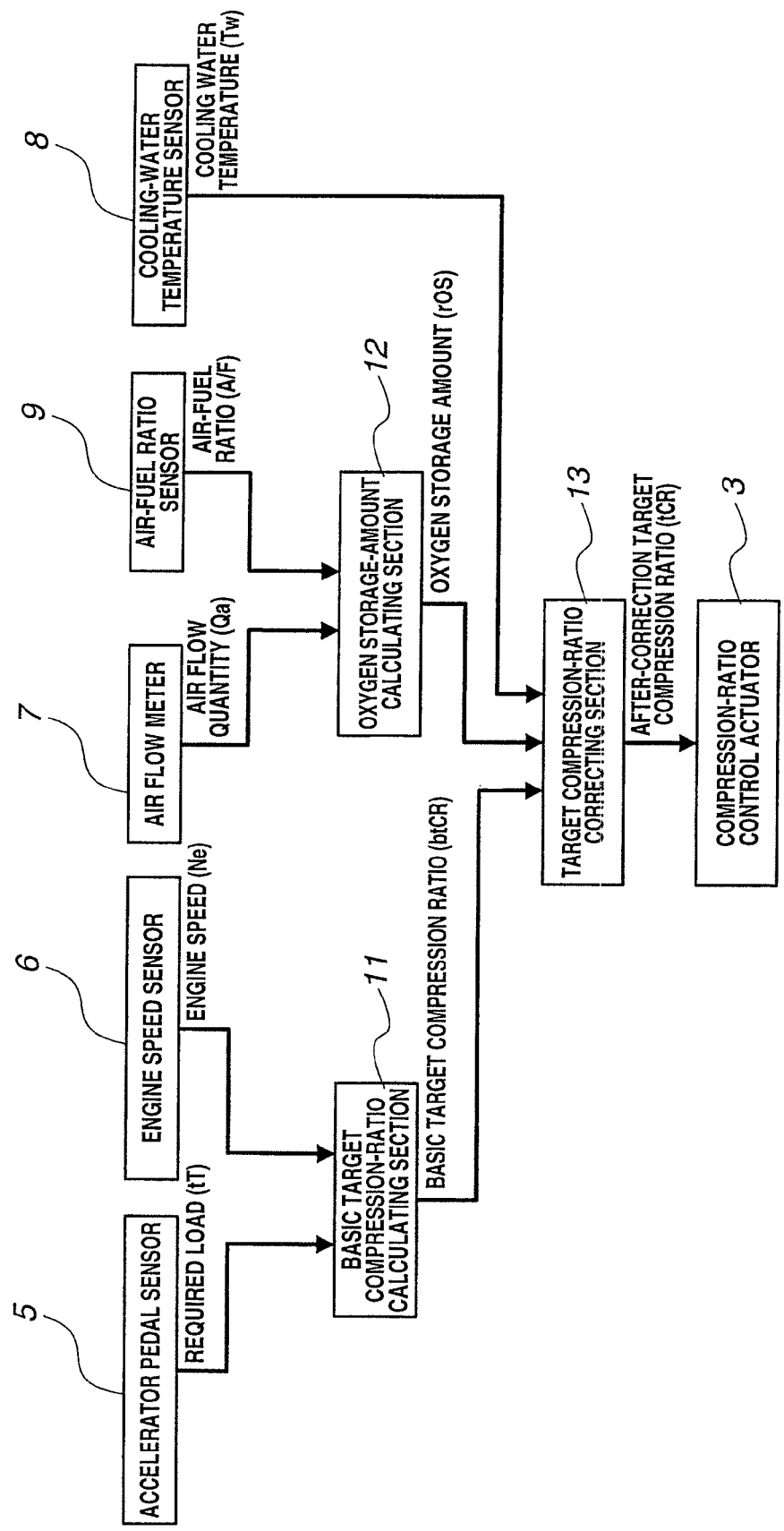
FIG. 2 A block diagram illustrating a compression-ratio control in the embodiment.

FIG. 2 is a control block diagram showing a compression-ratio control which is executed by the engine control unit 10. A basic target compression-ratio calculating section 11 calculates a basic value of the mechanical compression ratio, i.e. calculates a basic target compression ratio btCR, on the basis of the required load tT sensed by the accelerator pedal sensor 5 and the engine rotational speed Ne sensed by the rotational speed sensor 6. An oxygen storage-amount calculating section 12 calculates an oxygen storage amount rOS, from the intake air quantity Qa sensed by the air flow meter 7 and the air-fuel ratio (A/F) sensed by the air-fuel ratio sensor 9. The oxygen storage amount rOS is an amount of oxygen already absorbed and stored in the exhaust-emission purification catalyst 4 at that time. The oxygen storage amount rOS can be sequentially calculated from the intake air quantity Qa and the air-fuel ratio (A/F), because the oxygen storage amount increases when a lean gas as the exhaust air-fuel ratio flows through the exhaust-emission purification catalyst 4 whereas the oxygen storage amount decreases when a rich gas as the exhaust air-fuel ratio flows through the exhaust-emission purification catalyst 4. A target compression-ratio correcting section 13 calculates an after-correction target compression ratio tCR based on the basic target compression ratio btCR, the oxygen storage amount rOS and the cooling water temperature Tw, as mentioned below. The compression-ratio control actuator 3 is driven along the after-correction target compression ratio tCR.

Figure 3:
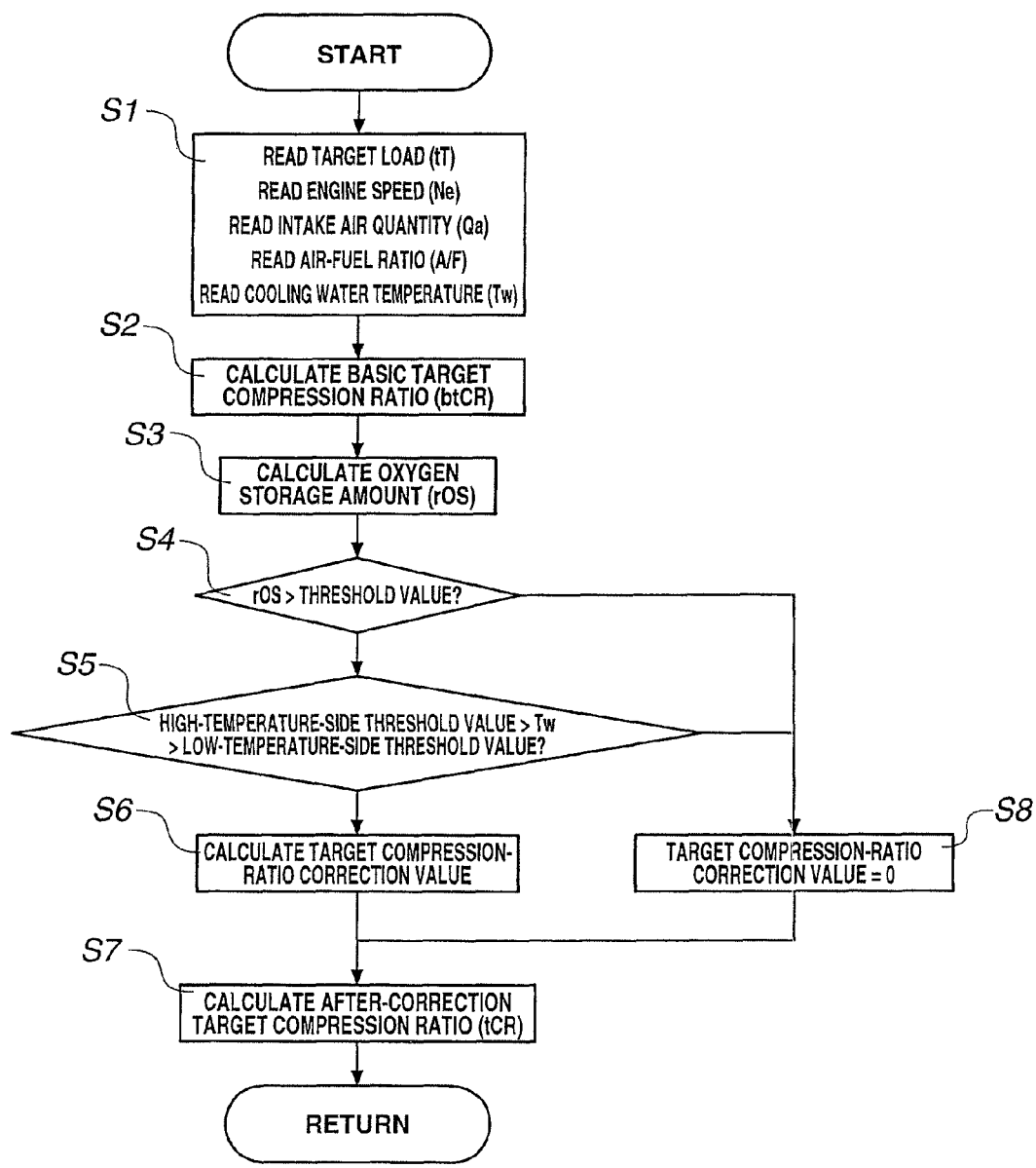
FIG. 3 A flowchart illustrating the compression-ratio control in the embodiment.

FIG. 3 is a flowchart showing a processing flow of the compression-ratio control in the engine control unit 10. At step S1, the required load tT, the engine rotational speed Ne, the intake air quantity Qa, the air-fuel ratio A/F and the cooling water temperature Tw are respectively read in. At step S2, the basic target compression ratio btCR is calculated from a previously-stored map in which the basic target compression ratio btCR is given relative to the required load tT and the engine rotational speed Ne at that time. At step S3, the oxygen storage amount rOS in the exhaust-emission purification catalyst 4 at that time is calculated from the intake air quantity Qa and the air-fuel ratio A/F.

At next step S4, it is judged whether or not the oxygen storage amount rOS is larger than a predetermined threshold value. If the oxygen storage amount rOS is larger than the predetermined threshold value, the program proceeds to step S5. If the oxygen storage amount rOS is smaller than or equal to the predetermined threshold value, the program proceeds to step S8. At step S5, it is judged whether or not the cooling water temperature Tw which correlates with a temperature of the exhaust-emission purification catalyst 4 is between a high-temperature-side first threshold value and a low-temperature-side second threshold value. If the cooling water temperature Tw is between (falls between) the first threshold value and the second threshold value, the program proceeds to step S6. If the cooling water temperature Tw is higher than or equal to the first threshold value, or if the cooling water temperature Tw is lower than or equal to the second threshold value, the program proceeds to step S8.

At next step S6, a target compression-ratio correction value is calculated on the basis of the oxygen storage amount rOS. In one example, the target compression-ratio correction value is given in proportion to a difference obtained by subtracting the above-mentioned threshold value from the oxygen storage amount rOS. That is, the target compression-ratio correction value is given as a larger value as the oxygen storage amount rOS becomes larger beyond the threshold value. Then, at step S7, the after-correction target compression ratio tCR is finally calculated from the basic target compression ratio btCR and the target compression-ratio correction value. In one example, the after-correction target compression ratio tCR is calculated by subtracting the target compression-ratio correction value from the basic target compression ratio btCR.

On the other hand, at step S8 subsequent to "NO" judgment of step S4 or step S5, the target compression-ratio correction value is set at 0 (zero). Then, the program proceeds to step S7. That is, in this case, the correction based on the oxygen storage amount rOS is not performed, so that the basic target compression ratio btCR is finally used as the after-correction target compression ratio tCR without any change.

Figure 4:
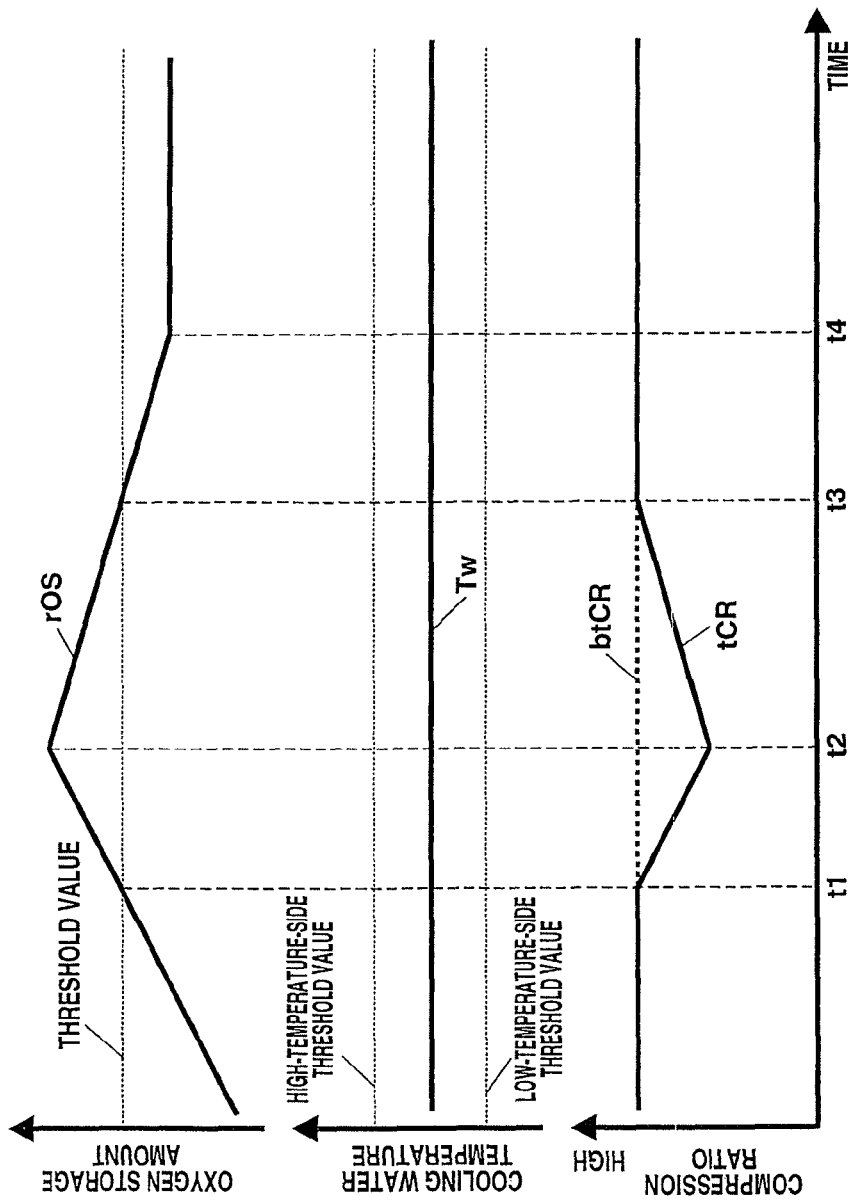
FIG. 4 A timing chart for explaining operations in the embodiment.

Next, operations of the compression-ratio control will now be explained referring to a timing chart of FIG. 4. In the case of FIG. 4, it is assumed that the cooling water temperature Tw is maintained at a substantially constant level between the high-temperature-side first threshold value and the low-temperature-side second threshold value. Basically, the oxygen storage amount rOS in the exhaust-emission purification catalyst 4 is kept within a proper range by an oxygen storage-amount control (i.e. by an air-fuel ratio control) of unillustrated other routine. However, in the case of FIG. 4, the oxygen storage amount rOS increases relatively greatly for some reason.

As shown in Figure, the oxygen storage amount rOS gradually increases and exceeds the predetermined threshold value at time point t1. Hence, at time point t1, the correction for reducing the target compression ratio tCR is started. Until time point t2, the target compression ratio tCR decreases with the increase of the oxygen storage amount rOS, by the target compression-ratio correction value which is proportional to the difference between the oxygen storage amount rOS and the threshold value. At time point S2, the air-fuel ratio is made richer by the oxygen storage-amount control of the unillustrated routine. Hence, thereafter, the oxygen storage amount rOS gradually decreases. In response to this decrease of the oxygen storage amount rOS, the target compression-ratio correction value gradually decreases so that the target compression ratio tCR continues to rise to approach the basic target compression ratio btCR. At time point t3, the target compression-ratio correction value becomes equal to 0 because the oxygen storage amount rOS sinks below the threshold value. After time point t3, the basic target compression ratio btCR is equal to the target compression ratio tCR. It is noted that the air-fuel ratio continues to be made richer until time point t4.

Figure 5:
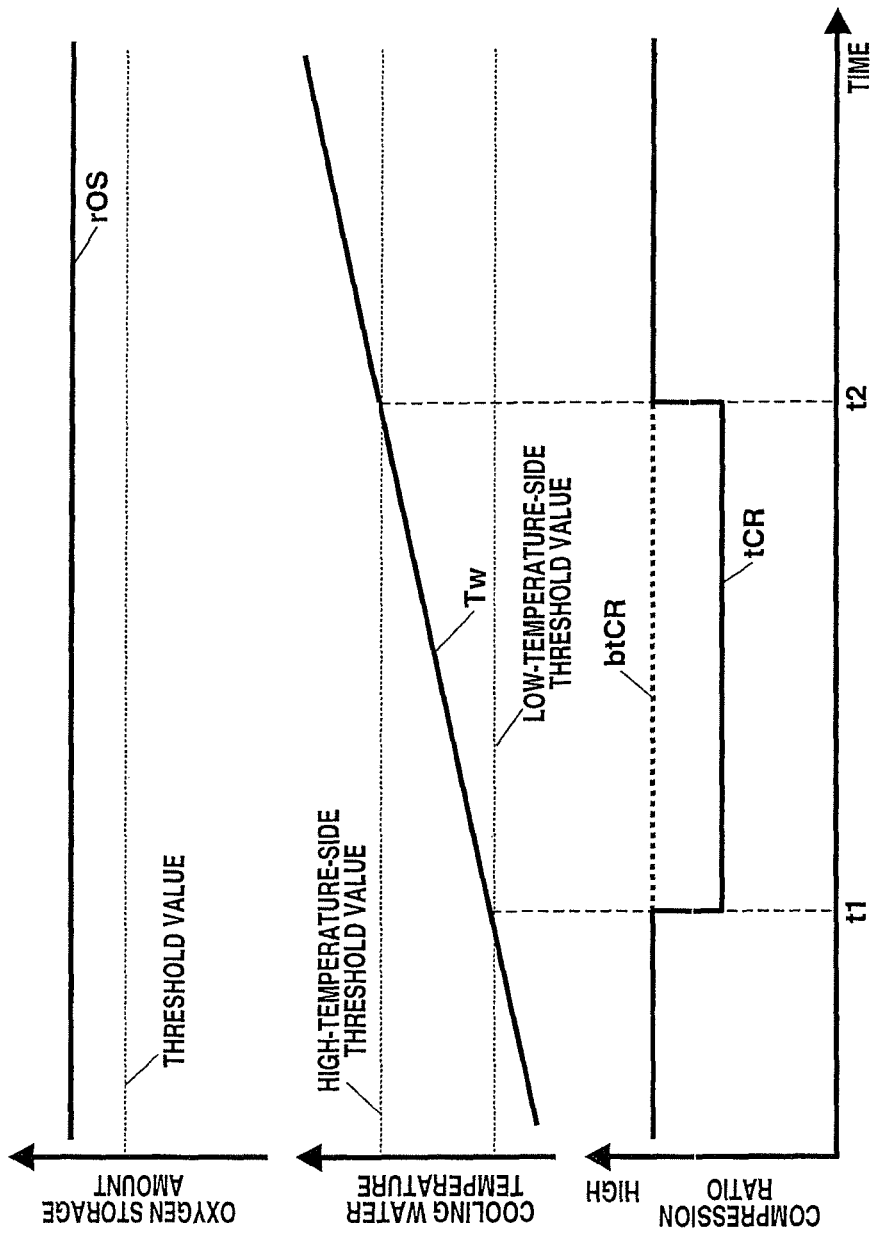
FIG. 5 A timing chart illustrating an example of operations in the case that a cooling water temperature is rising.

FIG. 5 is a timing chart for explaining a limit for the compression-ratio correction, on the basis of the cooling water temperature Tw. FIG. 5 shows a situation where the cooling water temperature Tw gradually rises from a cold-engine state. In the case of FIG. 5, the oxygen storage amount rOS is maintained above the threshold value during an illustrated temperature rise period, for purpose of simplifying explanations. However, in reality, the oxygen storage amount rOS is reduced by the air-fuel ratio control performed as the oxygen storage-amount control, as shown in FIG. 4.

In the example of FIG. 5, the cooling water temperature Tw is lower than the low-temperature-side second threshold value until time point U. Accordingly, even if the oxygen storage amount rOS is larger than the threshold value, the correction for the target compression ratio tCR is prohibited from being performed based on the oxygen storage amount rOS. In such a not-yet-warmed state, i.e. in the state where the temperature of the exhaust-emission purification catalyst 4 is low, a compression-ratio control for elevating the catalyst temperature is preferentially performed by unillustrated other routine.

In a range between time point t1 and time point t2, the cooling water temperature Tw is between (falls between) the high-temperature-side first threshold value and the low-temperature-side second threshold value. Accordingly, the correction of the target compression ratio tCR based on the oxygen storage amount rOS is executed. That is, the after-correction target compression ratio tCR becomes smaller than the basic target compression ratio btCR.

In the example of FIG. 5, the cooling water temperature Tw becomes higher than the high-temperature-side first threshold value at time point t2. Hence, the correction for the target compression ratio tCR is prohibited, so that the target compression ratio tCR becomes equal to the basic target compression ratio btCR. In this manner, the correction for reducing the target compression ratio tCR is prohibited when the cooling water temperature Tw which alternatively represents the temperature of the exhaust-emission purification catalyst 4 is high. Therefore, a deterioration of the exhaust-emission purification catalyst 4 due to heating can be suppressed.

In the above embodiment, the cooling water temperature Tw is used as a temperature parameter which represents the temperature of the exhaust-emission purification catalyst 4. However, the structure according to the present invention is not limited to this. The temperature of the exhaust-emission purification catalyst 4 may be directly sensed by a temperature sensor, or the other temperature parameter such as a lubricating oil temperature may be used.

Figure 6:
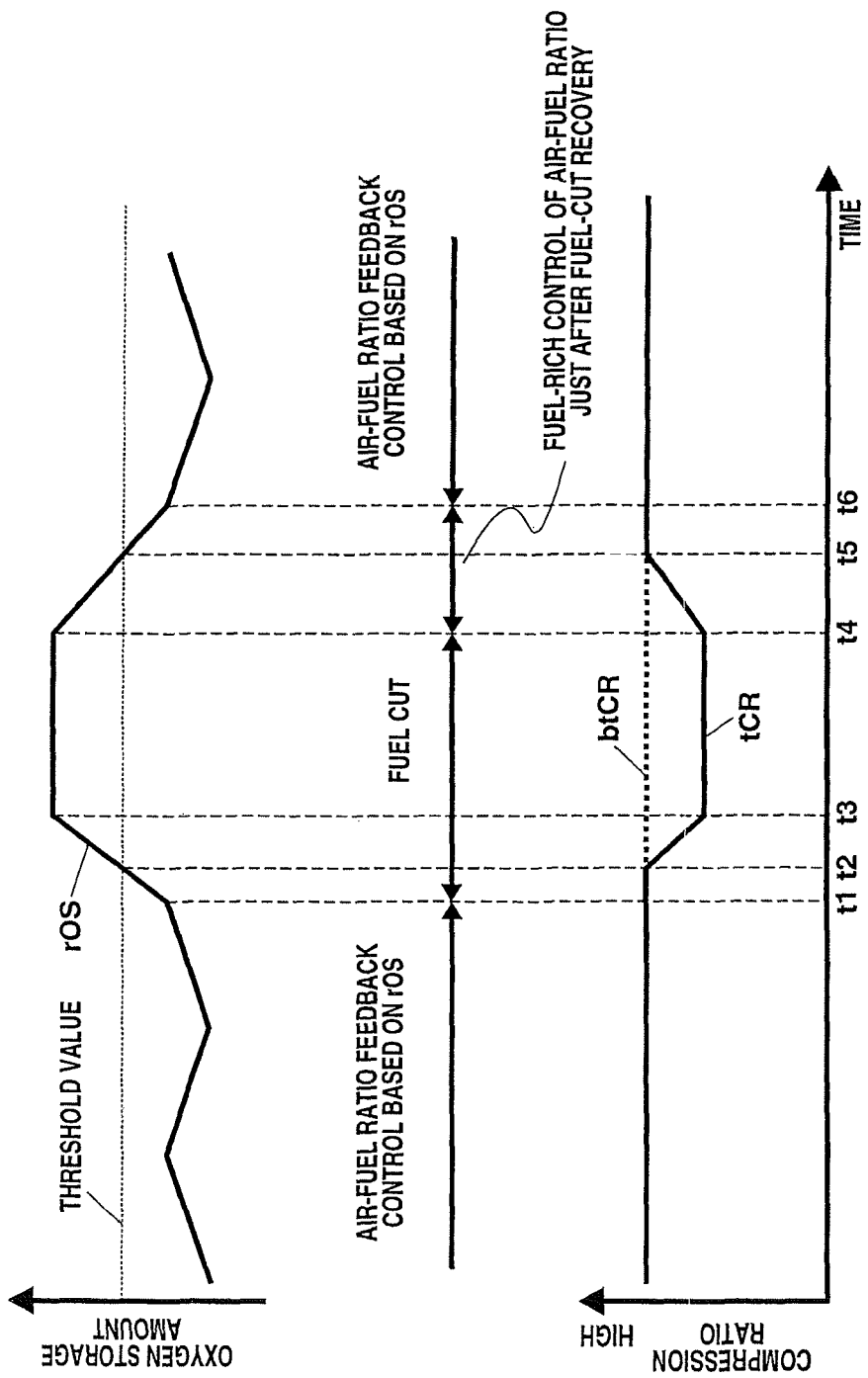
FIG. 6 A timing chart illustrating an example of operations in the case that a fuel cut and a fuel recovery are performed.

Next, FIG. 6 is a timing chart for explaining operations in the case that a fuel cut at the time of deceleration and a subsequent fuel recovery are conducted. In the case of FIG. 6, although the cooling water temperature Tw is not shown, the cooling water temperature Tw is maintained at a constant level between the high-temperature-side first threshold value and the low-temperature-side second threshold value in the same manner as FIG. 4. Moreover, it is assumed that the basic target compression ratio btCR according to the operating condition is also maintained at a constant level.

Until time point t1, an air-fuel ratio feedback control for bringing the oxygen storage amount rOS close to a predetermined target value is performed. Hence, the oxygen storage amount rOS repeatedly increases and decreases near the target value with a change of the air-fuel ratio.

At time point t1, the fuel cut is performed. When the fuel cut is performed, only air flows into the exhaust-emission purification catalyst 4 so that the oxygen storage amount rOS is rapidly increased.

At time point t2, the oxygen storage amount rOS reaches the predetermined threshold value. Hence, the reducing correction control for the target compression ratio tCR is started. In the example of this timing chart, the fuel cut is started in a state where the oxygen storage amount rOS is relatively large, i.e. is relatively near the threshold value.

(That is, the oxygen storage amount rOS at time point t1 is relatively large.) Hence, in a short time after the fuel cut is started, the oxygen storage amount rOS reaches the threshold value, so that the reducing correction for the target compression ratio tCR is started. That is, even if a duration time of the fuel cut is short, the reducing correction control for the target compression ratio tCR is conducted when the oxygen storage amount rOS reaches the threshold value, in contrast to the above-mentioned Patent Literature 1. Therefore, an emission amount of NOx is reliably prevented from being worsened due to an excess of the oxygen storage amount rOS immediately after the fuel recovery.

Moreover, contrary to the above, in a case that the fuel cut is started when the oxygen storage amount rOS is relatively small, a certain length of time is necessary for the oxygen storage amount rOS to reach the threshold value. Hence, if a condition for the fuel cut becomes unsatisfied during this certain length of time so that a fuel injection is resumed, the reducing correction for the target compression ratio tCR is not performed. Therefore, an unnecessary reduction of the compression ratio is avoided.

In a range between time point t2 and time point t3, the oxygen storage amount rOS gradually increases because of the fuel cut. In response to the gradual increase of the oxygen storage amount rOS, the target compression-ratio correction value gradually increases. Then, at time point t3, the oxygen storage amount rOS reaches a maximum oxygen storage amount of the exhaust-emission purification catalyst 4. Hence, after time point t3, the oxygen storage amount rOS is maintained at a constant level. Therefore, also the target compression-ratio correction value is maintained at a constant level after time point t3.

At time point t4, the condition for the fuel cut becomes unsatisfied, so that the fuel injection is resumed (i.e., fuel recovery). Immediately after the fuel recovery, a fuel-rich control for making richer the air-fuel ratio is performed by unillustrated other routine in order to quickly bring the oxygen storage amount rOS back to a predetermined target value. As a result, the oxygen storage amount rOS decreases at a relatively large gradient. This fuel-rich control continues to be performed until the oxygen storage amount rOS has returned and fallen within a range near the predetermined target value (i.e. until time point t6).

At time point t5 which exists in execution of the fuel-rich control, the oxygen storage amount rOS becomes equal to or smaller than the threshold value. In a time range between time point t4 (at which the fuel recovery is started) and time point t5, also the target compression-ratio correction value decreases with the decrease of the oxygen storage amount rOS. In the time range between time point t4 and time point t5, the oxygen storage amount rOS is in excess of the threshold value, and hence a NOx purification ability of the exhaust-emission purification catalyst 4 is low. However, the reducing correction for the target compression ratio tCR is performed so that a combustion temperature is lowered, and thereby an amount of NOx which is emitted from a combustion chamber of the internal combustion engine 1 is suppressed. Accordingly, also an amount of NOx which is released (emitted) through the exhaust-emission purification catalyst 4 to an outside (an external) is reduced. Therefore, an emission level of NOx is favorable. It is noted that, theoretically, the correction for reducing the compression ratio in order to suppress NOx which is generated in the combustion chamber has only to be executed only for the time range between time point t4 and time point t5 for which the combustion is actually done in the state where the oxygen storage amount rOS is in excess of the threshold value. However, in this example, the correction for reducing the compression ratio is started at time point t2 in execution of the fuel cut because the compression-ratio control of the variable compression-ratio mechanism 2 is accompanied by time delay.

At time point t6, the oxygen storage amount rOS returns and falls within the range near the predetermined target value. At this time, the fuel-rich control started immediately after the fuel recovery is terminated. Then, the air-fuel ratio feedback control based on the oxygen storage amount rOS is restarted.

In the above embodiment, the reducing correction for the target compression ratio tCR is performed based on the oxygen storage amount rOS of the exhaust-emission purification catalyst 4. Hence, for example, the reducing correction for the compression ratio is performed when the oxygen storage amount rOS is excessive even if the fuel cut has been conducted for a short time. Therefore, the worsening of NOx which is caused just after the fuel recovery can be certainly suppressed. On the other hand, in a case that the oxygen storage amount rOS does not become excessive even if the fuel cut has been conducted for a relatively long time, the (unnecessary) reduction of the compression ratio is not performed. Therefore, for example, a heating of the exhaust-emission purification catalyst 4 can be suppressed.

The present invention is not only applicable to an internal combustion engine equipped with a variable compression-ratio mechanism which uses a multilink-type piston-crank mechanism as mentioned in the above embodiment, but also applicable to internal combustion engines equipped with various types of variable compression-ratio mechanisms.

What is claimed is:

1. A control device for a variable compression-ratio internal combustion engine, the control device comprising:
    a variable compression-ratio mechanism configured to vary a mechanical compression ratio of the internal combustion engine;
    a control unit including an oxygen storage-amount obtaining section configured to calculate an oxygen storage amount of an exhaust-emission purification catalyst provided in an exhaust system of the internal combustion engine; and
    a sensor configured to sense a temperature parameter which correlates with a temperature of the exhaust-emission purification catalyst,
    wherein the control unit is configured
        to vary the mechanical compression ratio according to the oxygen storage amount, and
        to prohibit the mechanical compression ratio from being varied according to the oxygen storage amount, when the temperature parameter indicates a temperature level lower than a predetermined threshold value, and
    wherein:
        a basic value of the mechanical compression ratio is set according to an engine operating condition, and
        the mechanical compression ratio is reduced below the basic value when the oxygen storage amount is larger than a threshold value, and
    wherein:
        a reduction width of the mechanical compression ratio from the basic value is greater as the oxygen storage amount becomes larger, when the oxygen storage amount is larger than the threshold value.

2. The control device according to claim 1, wherein the control unit is configured to prohibit the mechanical compression ratio from being varied according to the oxygen storage amount, when the temperature parameter indicates a temperature level higher than a predetermined high-temperature-side threshold value.

3. A control method for a variable compression-ratio internal combustion engine, the variable compression-ratio internal combustion engine being capable of varying a mechanical compression ratio of the internal combustion engine, the control method comprising:
    calculating an oxygen storage amount of an exhaust-emission purification catalyst provided in an exhaust system of the internal combustion engine;
    obtaining a temperature parameter which correlates with a temperature of the exhaust-emission purification catalyst;
    varying the mechanical compression ratio according to the oxygen storage amount; and
    prohibiting the mechanical compression ratio from being varied according to the oxygen storage amount, when the temperature parameter indicates a temperature level lower than a predetermined threshold value, and
    wherein:
        a basic value of the mechanical compression ratio is set according to an engine operating condition, and
        the mechanical compression ratio is reduced below the basic value when the oxygen storage amount is larger than a threshold value, and
    wherein:
        a reduction width of the mechanical compression ratio from the basic value is greater as the oxygen storage amount becomes larger, when the oxygen storage amount is larger than the threshold value.

* * * * *